(12) United States Patent
Khan et al.

(10) Patent No.: US 9,411,531 B2
(45) Date of Patent: *Aug. 9, 2016

(54) MANAGING MEMORY AND STORAGE SPACE FOR A DATA OPERATION

(71) Applicant: Ab Initio Technology LLC, Lexington, MA (US)

(72) Inventors: Muhammad Arshad Khan, Sharon, MA (US); Stephen G. Rybicki, Boxborough, MA (US); Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,584

(22) Filed: Dec. 9, 2015

(65) Prior Publication Data

US 2016/0092139 A1 Mar. 31, 2016

Related U.S. Application Data

(63) Continuation of application No. 14/279,615, filed on May 16, 2014, now Pat. No. 9,235,505.

(60) Provisional application No. 61/824,686, filed on May 17, 2013.

(51) Int. Cl.
| | |
|---|---|
| *G06F 12/00* | (2006.01) |
| *G06F 3/06* | (2006.01) |
| *G06F 12/02* | (2006.01) |
| *G06F 9/50* | (2006.01) |

(52) U.S. Cl.
CPC ............ *G06F 3/0644* (2013.01); *G06F 3/0604* (2013.01); *G06F 3/0679* (2013.01); *G06F 9/5016* (2013.01); *G06F 9/5022* (2013.01); *G06F 12/0246* (2013.01); *G06F 2212/7204* (2013.01)

(58) Field of Classification Search
CPC .................... G06F 12/0246; G06F 2212/7204
See application file for complete search history.

(56) References Cited

U.S. PATENT DOCUMENTS 7,756,873 B2 7/2010 Gould et al.

OTHER PUBLICATIONS

Actian Corporation, "Vectorwise 2.5 Developer Guide" Action Corporation, Redwood City, CA, (31 pages) (2011).
Actian Corporation, "Vectorwise 2.0 User Guide" Action Corporation, Redwood City, CA, (31 pages) (2011).

*Primary Examiner* — Gurtej Bansal
(74) *Attorney, Agent, or Firm* — Occhiuti & Rohlicek LLP

(57) ABSTRACT

Processing a plurality of data units to generate result information, includes: performing a data operation for each data unit of a first subset of data units from the plurality of data units, and storing information associated with a result of the data operation in a first set of one or more data structures stored in working memory space of a memory device; after an overflow condition on the working memory space is satisfied, storing information in overflow storage space of a storage device; and repeating an overflow processing procedure multiple times during the processing of the plurality of data units, the overflow processing procedure including: updating a new set of one or more data structures stored in the working memory space using at least some information stored in the overflow storage space.

49 Claims, 8 Drawing Sheets

MANAGING MEMORY AND STORAGE SPACE FOR A DATA OPERATION

CROSS-REFERENCE TO RELATED APPLICATIONS

This application is a continuation of U.S. application Ser. No. 14/279,615, filed on May 16, 2014, which claims priority to U.S. Application Ser. No. 61/824,686, filed on May 17, 2013, each of which is incorporated herein by reference.

BACKGROUND

This description relates to managing memory and storage space for a data operation.

Some computing systems use a virtual memory scheme to manage a memory device used by programs executing within an operating system. For example, the operating system may handle translation between a larger virtual address space and a smaller real address space of the memory device (also called "main memory"), with pages of memory swapped in and out from a storage device that serves as a backing store with a larger storage capacity than the memory device. Thus, the amount of working memory accessible to a program is not limited by the size of main memory. In a virtual memory scheme, the movement of pages of addresses in the working memory of a program back and forth between the memory device and the backing store is generally transparent to the program using that working memory. Some computing systems may have hardware support for virtual memory such as a memory management unit (MMU) built into a central processing unit (CPU). Some computing systems may also use a caching system with one or more levels to store copies of a limited number of main memory addresses within relatively faster cache memory to speed repeated access of those memory addresses.

SUMMARY

In one aspect, in general, a computing system includes: a memory device providing a working memory space; a storage device providing an overflow storage space; and at least one processor configured to process a plurality of data units to generate result information. The processing includes: performing a data operation for each data unit of a first subset of data units from the plurality of data units and storing information associated with a result of the data operation in a first set of one or more data structures stored in the working memory space; after an overflow condition on the working memory space is satisfied, storing information in the overflow storage space and freeing at least some of the working memory space, and performing the data operation for each data unit of a second subset of data units from the plurality of data units and storing information associated with a result of the data operation in a second set of one or more data structures stored in the working memory space; and combining multiple sets of one or more data structures, including the first and second sets, to generate the result information. Storing the information associated with a result of the data operation in a set of one or more data structures includes, for at least one data unit, performing an operation that changes information in the set of one or more data structures without increasing the amount of the working memory space used for the set of one or more data structures.

Aspects can include one or more of the following features.

The overflow condition on the working memory space is satisfied if the amount of the working memory space used for the first set of one or more data structures is greater than or equal to a predetermined threshold.

The processing further includes, after the overflow condition being satisfied and before performing the data operation for each data unit of the second subset of data units, storing the first set of one or more data structures in the overflow storage space, and removing the first set of one or more data structures from the working memory space.

Combining multiple sets of one or more data structures includes merging at least one data structure from the first set with at least one data structure from the second set.

Merging at least one data structure from the first set with at least one data structure from the second set includes matching a first key in the data structure from the first set of one or more data structures with a second key in the data structure from the second set of one or more data structures, and performing an aggregation operation on a value associated with the first key and a value associated with the second key.

The processing further includes, after the overflow condition being satisfied and before performing the data operation for each data unit of the second subset of data units, performing the data operation for each data unit of a third subset of data units from the plurality of data units and storing information associated with a result of the data operation in the first set of one or more data structures stored in the working memory space.

The second subset of data units is a subset of the data units of the third subset of data units.

The processing further includes, after performing the data operation for a first data unit of the third subset of data units, determining whether to store information associated with a result of the data operation in: (1) the first set of one or more data structures stored in the working memory space, or (2) the overflow storage space.

The operation that changes information in the set of one or more data structures includes an in-place memory operation that overwrites a value stored in a location within the working memory space with a different value stored in the same location within the working memory space.

Storing information associated with a result of the data operation in the overflow storage space includes storing at least some content of the first data unit in the overflow storage space.

Performing the data operation for the first data unit includes comparing a key in the first data unit to one or more keys in the first set of one or more data structures, and the information associated with a result of the data operation is stored in the first set of one or more data structures stored in the working memory space if the comparison results in a match, and the information associated with a result of the data operation is stored in the overflow storage space if the comparison does not result in a match.

The processing further includes generating the plurality of data units from a data source, with each data unit including an identifier for a field of the data source and a value appearing in that field within a record of the data source.

The data operation includes an aggregation of information from multiple data units using the values included in the data units as keys for selecting matching data units from which information is aggregated.

The memory device includes a volatile memory device.

The storage device includes a non-volatile storage device.

In another aspect, in general, a computing system includes: means for providing a working memory space; means for providing an overflow storage space; and means for processing a plurality of data units to generate result information. The processing includes: performing a data operation for each data unit of a first subset of data units from the plurality of data units and storing information associated with a result of the data operation in a first set of one or more data structures stored in the working memory space; after an overflow condition on the working memory space is satisfied, storing information in the overflow storage space and freeing at least some of the working memory space, and performing the data operation for each data unit of a second subset of data units from the plurality of data units and storing information associated with a result of the data operation in a second set of one or more data structures stored in the working memory space; and combining multiple sets of one or more data structures, including the first and second sets, to generate the result information. Storing the information associated with a result of the data operation in a set of one or more data structures includes, for at least one data unit, performing an operation that changes information in the set of one or more data structures without increasing the amount of the working memory space used for the set of one or more data structures.

In another aspect, in general, a method for processing a plurality of data units to generate result information, including: performing a data operation for each data unit of a first subset of data units from the plurality of data units and storing information associated with a result of the data operation in a first set of one or more data structures stored in working memory space of a memory device; after an overflow condition on the working memory space is satisfied, storing information in overflow storage space of a storage device and freeing at least some of the working memory space, and performing the data operation for each data unit of a second subset of data units from the plurality of data units and storing information associated with a result of the data operation in a second set of one or more data structures stored in the working memory space; and combining multiple sets of one or more data structures, including the first and second sets, to generate the result information. Storing the information associated with a result of the data operation in a set of one or more data structures includes, for at least one data unit, performing an operation that changes information in the set of one or more data structures without increasing the amount of the working memory space used for the set of one or more data structures.

In another aspect, in general, software is stored on a computer-readable medium for processing a plurality of data units to generate result information. The software includes instructions for causing a computing system to: perform a data operation for each data unit of a first subset of data units from the plurality of data units and storing information associated with a result of the data operation in a first set of one or more data structures stored in the working memory space of a memory device; after an overflow condition on the working memory space is satisfied, store information in overflow storage space of a storage device and freeing at least some of the working memory space, and perform the data operation for each data unit of a second subset of data units from the plurality of data units and storing information associated with a result of the data operation in a second set of one or more data structures stored in the working memory space; and combine multiple sets of one or more data structures, including the first and second sets, to generate the result information. Storing the information associated with a result of the data operation in a set of one or more data structures includes, for at least one data unit, performing an operation that changes information in the set of one or more data structures without increasing the amount of the working memory space used for the set of one or more data structures.

In another aspect, in general, a computing system includes: a memory device providing a working memory space; a storage device providing an overflow storage space; and at least one processor configured to process a plurality of data units to generate result information. The processing includes: performing a data operation for each data unit of a first subset of data units from the plurality of data units and storing information associated with a result of the data operation in a first set of one or more data structures stored in the working memory space; and after an overflow condition on the working memory space is satisfied, performing the data operation for each data unit of a second subset of data units from the plurality of data units and determining whether to store information associated with a result of the data operation in: (1) the first set of one or more data structures stored in the working memory space, or (2) the overflow storage space.

Aspects can include one or more of the following features.

The overflow condition on the working memory space is satisfied if the amount of the working memory space used for the first set of one or more data structures is greater than or equal to a predetermined threshold.

The data operation is based at least in part on a key value in each data unit, and the determining includes searching for at least one key value in at least one of the data structures of the first set to determine whether to: (1) update information associated with that key value in a data structure of the first set of one or more data structures in the working memory space, or (2) store information associated with that key value in the overflow storage space.

The data operation includes an in-place memory operation that overwrites a value stored in a location within the working memory space with a different value stored in the same location within the working memory space.

Storing information associated with a result of the data operation in the overflow storage space includes storing at least some content of the data unit on which the data operation is performed in the overflow storage space.

Performing the data operation for a first data unit includes comparing a key in the first data unit to one or more keys in the first set of one or more data structures, and the information associated with a result of the data operation is stored in the first set of one or more data structures stored in the working memory space if the comparison results in a match, and the information associated with a result of the data operation is stored in the overflow storage space if the comparison does not result in a match.

The processing further includes generating the plurality of data units from a data source, with each data unit including an identifier for a field of the data source and a value appearing in that field within a record of the data source.

The data operation includes an aggregation of information from multiple data units using the values included in the data units as keys for selecting matching data units from which information is aggregated.

Generating the plurality of data units includes generating data units for at least a first field of the data source and at least a second field of the data source.

Performing the data operation for each data unit of the second subset includes: storing information associated with a result of the data operation performed on a first data unit in the first set of one or more data structures, and storing information associated with a result of the data operation performed on a second data unit in the overflow storage space.

The first data unit and the second data unit include respective identifiers for the same field of the data source.

The memory device includes a volatile memory device.

The storage device includes a non-volatile storage device.

In another aspect, in general, a computing system includes: means for providing a working memory space; means for providing an overflow storage space; and means for processing a plurality of data units to generate result information. The processing includes: performing a data operation for each data unit of a first subset of data units from the plurality of data units and storing information associated with a result of the data operation in a first set of one or more data structures stored in the working memory space; and after an overflow condition on the working memory space is satisfied, performing the data operation for each data unit of a second subset of data units from the plurality of data units and determining whether to store information associated with a result of the data operation in: (1) the first set of one or more data structures stored in the working memory space, or (2) the overflow storage space.

In another aspect, in general, a method for processing a plurality of data units to generate result information includes: performing a data operation for each data unit of a first subset of data units from the plurality of data units and storing information associated with a result of the data operation in a first set of one or more data structures stored in working memory space of a memory device; and after an overflow condition on the working memory space is satisfied, performing the data operation for each data unit of a second subset of data units from the plurality of data units and determining whether to store information associated with a result of the data operation in: (1) the first set of one or more data structures stored in the working memory space, or (2) overflow storage space of a storage device.

In another aspect, in general, software is stored on a computer-readable medium for processing a plurality of data units to generate result information. The software including instructions for causing a computing system to: perform a data operation for each data unit of a first subset of data units from the plurality of data units and storing information associated with a result of the data operation in a first set of one or more data structures stored in working memory space of a memory device; and after an overflow condition on the working memory space is satisfied, perform the data operation for each data unit of a second subset of data units from the plurality of data units and determine whether to store information associated with a result of the data operation in: (1) the first set of one or more data structures stored in the working memory space, or (2) overflow storage space of a storage device.

In another aspect, in general, a computing system includes: a memory device providing a working memory space; a storage device providing an overflow storage space; and at least one processor configured to process a plurality of data units to generate result information. The processing includes: performing a data operation for each data unit of a first subset of data units from the plurality of data units, the data operation including searching for a value in the data unit within at least one data structure of a first set of one or more data structures stored in the working memory space, and if the value is found modifying information in at least one data structure of the first set, and if the value is not found adding information to at least one data structure of the first set; after an overflow condition on the working memory space is satisfied, storing information in the overflow storage space and freeing at least some of the working memory space, and for each data unit of a second subset of data units from the plurality of data units, performing the data operation including searching for a value in the data unit within at least one data structure of a second set of one or more data structures stored in the working memory space, and if the value is found modifying information in at least one data structure of the second set; and combining multiple sets of one or more data structures, including the first and second sets, to generate the result information.

Aspects can include one or more of the following features.

The overflow condition on the working memory space is satisfied if the amount of the working memory space used for the first set of one or more data structures is greater than or equal to a predetermined threshold.

The processing further includes, after the overflow condition being satisfied and before performing the searching for each data unit of the second subset of data units, storing the first set of one or more data structures in the overflow storage space, and removing the first set of one or more data structures from the working memory space.

Combining multiple sets of one or more data structures includes merging at least one data structure from the first set with at least one data structure from the second set.

Merging at least one data structure from the first set with at least one data structure from the second set includes matching a first key in the data structure from the first set of one or more data structures with a second key in the data structure from the second set of one or more data structures, and performing an aggregation operation on a value associated with the first key and a value associated with the second key.

The processing further includes, after the overflow condition being satisfied and before performing the searching for each data unit of the second subset of data units, for each data unit of a third subset of data units from the plurality of data units, searching for a value in the data unit within at least one data structure of the first set of one or more data structures stored in the working memory space, and if the value is found modifying information in at least one data structure of the first set.

The second subset of data units is a subset of the data units of the third subset of data units.

Modifying the information includes performing an in-place memory operation that overwrites a value stored in a location within the working memory space with a different value stored in the same location within the working memory space.

The processing further includes generating the plurality of data units from a data source, with each data unit including an identifier for a field of the data source and a value appearing in that field within a record of the data source.

The first set of one or more data structures includes a plurality of associative arrays of key-value pair entries.

Searching for the value in the data unit within at least one data structure of a first set of one or more data structures stored in the working memory space includes searching for the value as a key for an entry within a selected one of the associative arrays of key-value pair entries.

The selected one of the associative arrays of key-value pair entries corresponds to the identifier in the data unit.

Modifying information in at least one data structure of the first set includes incrementing the value of the key-value pair entry that was found.

Adding information to at least one data structure of the first set includes adding a new key-value pair entry to the selected array having as its key the value in the data unit and having as its value a count of one.

The memory device includes a volatile memory device.

The storage device includes a non-volatile storage device.

In another aspect, in general, a computing system includes: means for providing a working memory space; means for providing an overflow storage space; and means for processing a plurality of data units to generate result information. The processing includes: performing a data operation for each data unit of a first subset of data units from the plurality of data units, the data operation including searching for a value in the data unit within at least one data structure of a first set of one or more data structures stored in the working memory space, and if the value is found modifying information in at least one data structure of the first set, and if the value is not found adding information to at least one data structure of the first set; after an overflow condition on the working memory space is satisfied, storing information in the overflow storage space and freeing at least some of the working memory space, and for each data unit of a second subset of data units from the plurality of data units, performing the data operation including searching for a value in the data unit within at least one data structure of a second set of one or more data structures stored in the working memory space, and if the value is found modifying information in at least one data structure of the second set; and combining multiple sets of one or more data structures, including the first and second sets, to generate the result information.

In another aspect, in general, a method for processing a plurality of data units to generate result information includes: performing a data operation for each data unit of a first subset of data units from the plurality of data units, the data operation including searching for a value in the data unit within at least one data structure of a first set of one or more data structures stored in working memory space of a memory device, and if the value is found modifying information in at least one data structure of the first set, and if the value is not found adding information to at least one data structure of the first set; after an overflow condition on the working memory space is satisfied, storing information in overflow storage space of a storage device and freeing at least some of the working memory space, and for each data unit of a second subset of data units from the plurality of data units, performing the data operation including searching for a value in the data unit within at least one data structure of a second set of one or more data structures stored in the working memory space, and if the value is found modifying information in at least one data structure of the second set; and combining multiple sets of one or more data structures, including the first and second sets, to generate the result information.

In another aspect, in general, software is stored on a computer-readable medium for processing a plurality of data units to generate result information. The software includes instructions for causing a computing system to: perform a data operation for each data unit of a first subset of data units from the plurality of data units, the data operation including searching for a value in the data unit within at least one data structure of a first set of one or more data structures stored in working memory space of a memory device, and if the value is found modifying information in at least one data structure of the first set, and if the value is not found adding information to at least one data structure of the first set; after an overflow condition on the working memory space is satisfied, store information in overflow storage space of a storage device and free at least some of the working memory space, and for each data unit of a second subset of data units from the plurality of data units, perform the data operation including searching for a value in the data unit within at least one data structure of a second set of one or more data structures stored in the working memory space, and if the value is found modifying information in at least one data structure of the second set; and combine multiple sets of one or more data structures, including the first and second sets, to generate the result information.

In another aspect, in general, a computing system includes: a memory device providing a working memory space; a storage device providing an overflow storage space; and at least one processor configured to process a plurality of data units to generate result information. The processing includes: performing a data operation for each data unit of a first subset of data units from the plurality of data units, and storing information associated with a result of the data operation in a first set of one or more data structures stored in the working memory space; after an overflow condition on the working memory space is satisfied, storing information in the overflow storage space; and repeating an overflow processing procedure multiple times during the processing of the plurality of data units, the overflow processing procedure including: updating a new set of one or more data structures stored in the working memory space using at least some information stored in the overflow storage space.

Aspects can include one or more of the following features.

The overflow condition on the working memory space is satisfied if the amount of the working memory space used for the first set of one or more data structures is greater than or equal to a predetermined threshold.

The processing further includes, after the overflow condition being satisfied and before performing the data operation for each data unit of the second subset of data units, storing the first set of one or more data structures in the overflow storage space as a moved set, and removing the first set of one or more data structures from the working memory space.

Updating a new set of one or more data structures stored in the working memory space using at least some information stored in the overflow storage space includes merging information from at least one data structure from the moved set of one or more data structures stored in the overflow storage space with at least one data structure from the new set of one or more data structures stored in the working memory space.

The merging includes matching a first key in the data structure from the moved set of one or more data structures with a second key in the data structure from the new set of one or more data structures, and performing an aggregation operation on a value associated with the first key and a value associated with the second key.

Updating a new set of one or more data structures stored in the working memory space using at least some information stored in the overflow storage space includes matching a first key in a data unit stored in the overflow storage space with a second key in a data structure from the new set of one or more data structures, and incrementing a value associated with the second key.

Updating a new set of one or more data structures stored in the working memory space using at least some information stored in the overflow storage space includes performing an in-place memory operation that overwrites a value stored in a location within the working memory space with a different value stored in the same location within the working memory space.

The processing further includes generating the plurality of data units from a data source, with each data unit including an identifier for a field of the data source and a value appearing in that field within a record of the data source.

The data operation includes an aggregation of information from multiple data units using the values included in the data units as keys for selecting matching data units from which information is aggregated.

The first set of one or more data structures includes a plurality of associative arrays of key-value pair entries.

The data operation for a first data unit includes using a value in the first data unit as a key to search within a selected one of the associative arrays of key-value pair entries.

The selected one of the associative arrays of key-value pair entries corresponds to the identifier in the first data unit.

The memory device includes a volatile memory device.

The storage device includes a non-volatile storage device.

In another aspect, in general, a computing system includes: means for providing a working memory space; means for providing an overflow storage space; and means for processing a plurality of data units to generate result information. The processing includes: performing a data operation for each data unit of a first subset of data units from the plurality of data units, and storing information associated with a result of the data operation in a first set of one or more data structures stored in the working memory space; after an overflow condition on the working memory space is satisfied, storing information in the overflow storage space; and repeating an overflow processing procedure multiple times during the processing of the plurality of data units, the overflow processing procedure including: updating a new set of one or more data structures stored in the working memory space using at least some information stored in the overflow storage space.

In another aspect, in general, a method for processing a plurality of data units to generate result information includes: performing a data operation for each data unit of a first subset of data units from the plurality of data units, and storing information associated with a result of the data operation in a first set of one or more data structures stored in working memory space of a memory device; after an overflow condition on the working memory space is satisfied, storing information in overflow storage space of a storage device; and repeating an overflow processing procedure multiple times during the processing of the plurality of data units, the overflow processing procedure including: updating a new set of one or more data structures stored in the working memory space using at least some information stored in the overflow storage space.

In another aspect, in general, software is stored on a computer-readable medium for processing a plurality of data units to generate result information. The software includes instructions for causing a computing system to: perform a data operation for each data unit of a first subset of data units from the plurality of data units, and store information associated with a result of the data operation in a first set of one or more data structures stored in working memory space of a memory device; after an overflow condition on the working memory space is satisfied, store information in overflow storage space of a storage device; and repeat an overflow processing procedure multiple times during the processing of the plurality of data units, the overflow processing procedure including: updating a new set of one or more data structures stored in the working memory space using at least some information stored in the overflow storage space.

Aspects can have one or more of the following advantages.

Some computing systems (e.g., some database management systems) do not rely solely on virtual memory to manage working memory, but are able to directly control whether data being processed is to be stored in main memory or in an overflow storage space in the storage device. For example, some systems impose an explicit limit on the size of the working memory that is available to a program, with that working memory limit being smaller than the size of main memory (e.g., since that program may be sharing the working memory with other programs). If the program approaches that working memory limit, the program has the option to use a "spill to disk" technique to temporarily store some data within the overflow storage space and finish processing that data later, after enough working memory has been made available. In some cases, spilling data to disk, or relying on the operating system to swap memory pages, can have a large effect on the performance of a data operation.

For some applications of data processing systems, such as the data profiling described in more detail below, if a data operation is meant to be performed on a potentially large amount of data (e.g., large datasets and/or a large numbers of datasets), the system should be configured to manage the working memory and overflow storage space in an efficient manner in order to ensure that the data processing application can provide adequate performance. One approach to managing the working memory and overflow storage space is based on the recognition that, for some data operations, instead of spilling incoming data to disk without processing it, the system can at least partially perform the data operation on that incoming data, and in some cases avoid the need to spill that incoming data to disk.

For example, some data operations process a stream of incoming records that are each associated with a key value, and for records whose key value matches a previous key value, the data operation updates a result stored in a data structure in memory. In some implementations, the computing system described herein is able to keep processing new records with any key even after the working memory limit has been reached, using an "overflow processing" procedure. Two specific examples of overflow processing procedures are described. Both procedures enable some records to be matched and used to update a result data structure without having to spill those records. For the matched records, the result data structure can be updated in-place without using more memory. One overflow processing procedure handles overflow by moving only the result data structure to overflow storage and continuing to process all new records (in a new result data structure to be merged with the moved result data structure), and the other overflow processing procedure handles overflow by moving only non-matching records to overflow storage and continuing to process all new records (in the same result data structure).

One example of a data operation that can be performed using the techniques described herein is a census operation used to generate a census of data values (including values appearing in a dataset and a count for each value) within a large dataset for profiling the dataset. A data profiling operation may include any operation that is performed on data that is being processed during the execution of a data profiling procedure, such as the census operation. A census operation may also be performed on data that is being processed in other contexts, such as in a data quality system that tracks characteristics of data over time. Other data operations to which the techniques can be applied include data operations that allow merging of incomplete results, and data operations for which at least some cases can be handled in-place within a data structure in memory, as described in more detail below. The techniques can be used to process data units such as the normalized records described herein, or any other data unit that represents an individual portion of data within a stream of data.

Other features and advantages of the invention will become apparent from the following description, and from the claims.

DESCRIPTION

Figure 1:
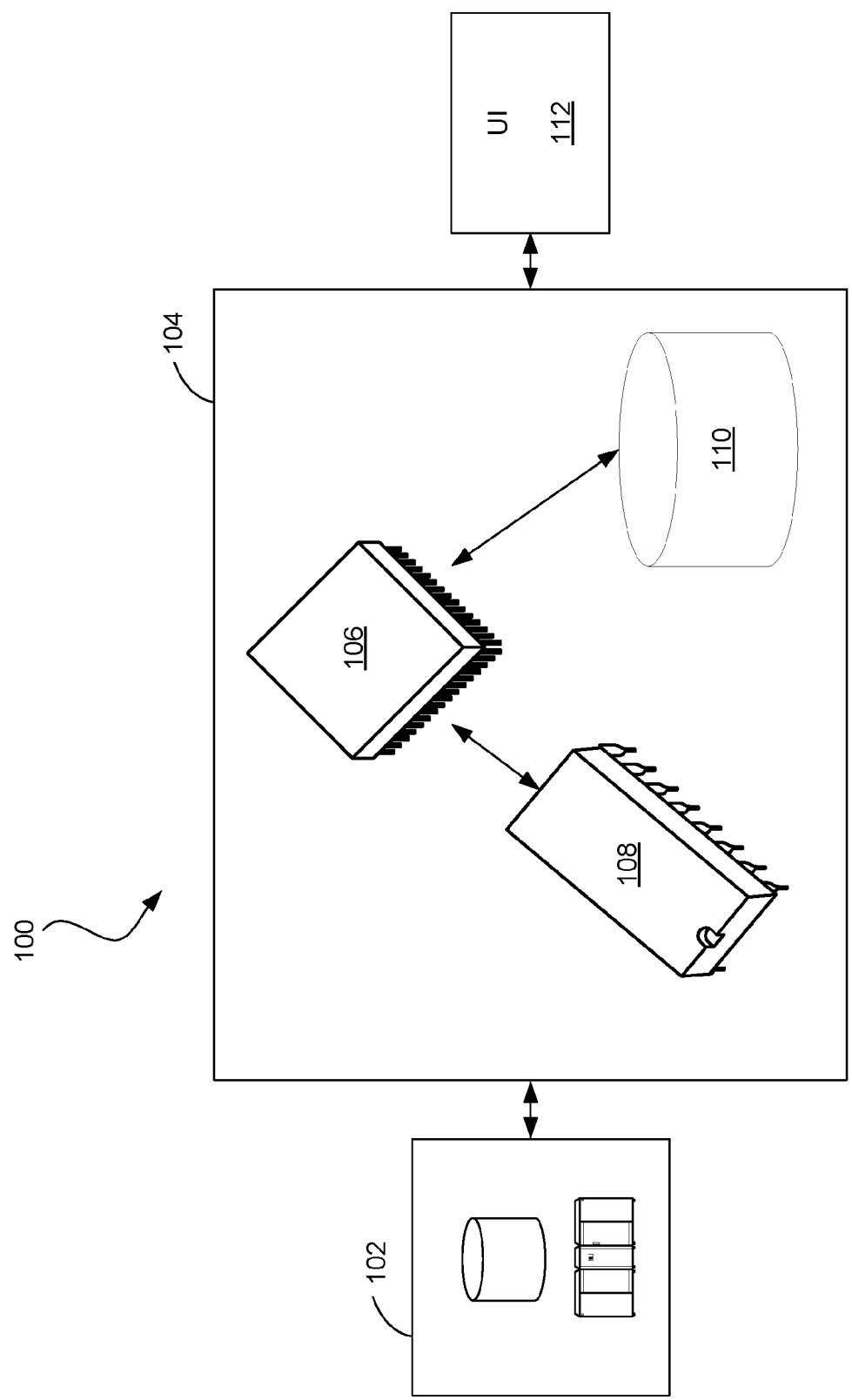
FIG. 1 is a block diagram of a data processing system.

FIG. 1 shows an example of a data processing system 100 in which the techniques to manage working memory and overflow storage space can be used. The data processing system 100 includes a data source 102 that may include one or more sources of data such as storage devices or connections to online data streams, each of which may store or provide data in any of a variety of formats (e.g., database tables, spreadsheet files, flat text files, or a native format used by a mainframe). The data processing system 100 includes a computing system 104, which includes at least one processor 106, at least one memory device 108 (e.g., volatile memory such as Dynamic Random Access Memory) coupled to the processor 106, and at least one storage device 110 (e.g., non-volatile storage such as a magnetic hard disk drive) coupled to the processor 106. After the computing system 100 processes data from the data source 102, results of that processing may be provided in a user interface (UI) 112, including automatically providing visual indications to a user about conditions that prevail in the data source 102 or about conditions that will prevail in a destination that is to receive and process data from the data source 102.

A variety of configurations of different components of the data processing system 100 are possible. The processor 106 may be configured to host an execution environment controlled, for example, by a suitable operating system, such as a version of the UNIX operating system. In some implementations, the computing system 104 may be part of a multiple-node parallel computing environment including a configuration of multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof. Storage devices providing the data source 102 may be local to the computing system 104, for example, being stored on a storage medium connected to the computing system 104 (including the storage device 110), or may be remote to the computing system 104, for example, being hosted on a remote system (e.g., a mainframe) in communication with the computing system 104, over a remote connection (e.g., provided by a cloud computing infrastructure).

In some implementations, the computing system 104 is configured to execute applications as dataflow graphs that include nodes (representing data processing components or datasets) connected by directed links (representing flows of work elements, i.e., data) between the nodes. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The computing system 104 can receive data from a variety of types of systems that may embody the data source 102, including different forms of database systems. The data may be organized as datasets representing a collection of records that have values for respective fields (also called "attributes" or "columns"), including possibly null values. When first reading data from a data source, the computing system 104 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

One example of a type of processing that the data processing system 100 is able to perform on the data within the data source 102 is data profiling. Stored datasets may include data for which various characteristics are not known beforehand. For example, ranges of values or typical values for a dataset, relationships between different fields within the dataset, or functional dependencies among values in different fields, may be unknown. Data profiling can involve examining any number of potentially related datasets in order to determine such characteristics. The computing system 104 may also perform various tasks such as cleansing the data in the data source 102 or managing metadata for datasets stored in the data source 102. In implementations in which the computing system 104 is configured to execute applications as dataflow graphs, the data profiling can be performed, for example, by a profiler component node in a data flow graph that has an input port connected by a dataflow link to an input dataset and an output port connected by a dataflow link to a downstream component configured to perform a task using results of the data profiling.

When performing data profiling, the computing system 104 reads data from the data source 102 and stores profiling summary information, which can be used to perform various types of analysis to characterize different datasets and different fields within different datasets. In some implementations, the profiling summary information includes a census of the values appearing within particular fields (e.g., selected fields of selected datasets, or all fields of all datasets). The census lists all of the distinct values within a field and quantifies the number of times each distinct value appears. In some implementations, the census data is stored in a single data structure, optionally indexed by field, and in other implementations, the census data is stored in multiple data structures, for example, one for each field.

The census data for a particular field being profiled can be organized as a list of entries, with each entry including: an identifier for the field, a value appearing within the field, and a count of a number of records in which that value appears in that field. There is an entry for each distinct value, so each value in an entry is different from the values in other entries, and the number of entries is equal to the number of distinct values appearing within a field. The identifier for the field can be any value that uniquely identifies the field being profiled. For example, the fields being profiled can be enumerated by assigning each field an integer index in a range from 1 to the number of fields being profiled. Such an index can be stored compactly within the census data structure. Even if the census data for different fields are stored in separate data structures, it may still be useful to include the particular field identifier for that field within each entry of the data structure (e.g., to distinguish entries from different data structures streamed into a processing module). Alternatively, in some implementations, if the census data for different fields are stored in separate data structures the field only has to be stored once for that data structure, and each entry is implicitly associated with that field and only includes the value and the count.

Figure 2:
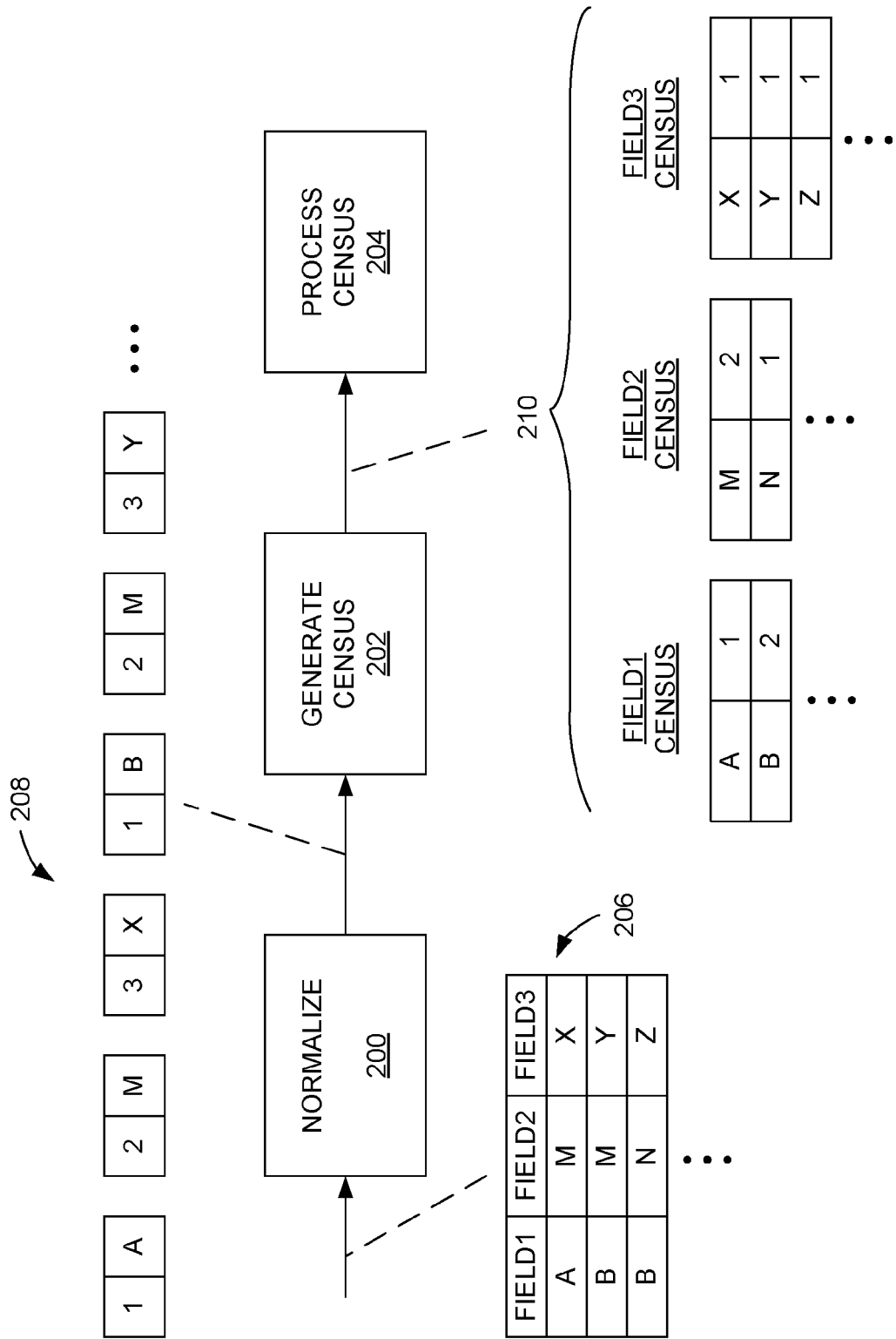
FIG. 2 is a schematic diagram of a data profiling procedure.

FIG. 2 illustrates an example of a census based data profiling procedure performed by a program executing on the computing system 104 that includes: a normalize module 200 for generating a stream 208 of normalized records, a census generation module 202 for processing the stream 208 of normalized records into census files 210, and a census processing module 204 for analyzing the census files 210 to compute profile results. The normalize module 200 reads one or more datasets to be profiled, such as a table 206. The table 206 has three fields, named FIELD1, FIELD2, and FIELD3, and the first few data records in the table 206 (for the first three rows) are shown with respective values for each of the three fields. The normalize module 200 generates normalized records by breaking a particular data record into a series of normalized records that each include: a field index, and a data value. The field index is an index value that was assigned to a particular field to uniquely (and efficiently) identify that field (e.g., 1=FIELD1, 2=FIELD2, 3=FIELD3), and the data value is the corresponding value contained in the data record for that field. In this example, the first data record in the table 206 would yield the following (field index, data value) pairs within three respective normalized records: (1, A), (2, M), (3, X). The census generation module 202 aggregates data values from the normalized records in the stream 208 to produce the census files 210. (In FIG. 2, the values shown in the entries of the census files 210 correspond to the first three data records in the table 206, which would be updated as normalized records from additional data records in the table 206 were processed by the census generation module 202.)

For a particular dataset, the normalized records can be inserted into the stream 208 in any order. In this example, the stream 208 includes all of the normalized records for a particular data record followed by all of the normalized records for the next data record as the data records appear in the table 206. Alternatively, the table 206 could be processed by field, such that the stream includes all of the normalized records for a particular field followed by all of the normalized records for the next field as the fields appear in the table 206. Higher dimensional data sets can also be normalized in this way, with normalized records being added to the output stream based, for example, on an order that will be most efficient for reading the dataset, or for generating the census files from the resulting stream. The stream 208 of normalized records can be written into a file to be processed by the downstream census generation module 202 after all normalized records have been generated, or the stream 208 of normalized records can be provided to the down stream census generation module 202 as they are being generated (e.g., to take advantage of the resulting pipeline parallelism).

The census generation module 202 processes the normalized records until the end of the stream 208 is reached (e.g., as indicated by an end-of-stream record). The module 202 performs a type of census operation on a normalized record, called a "census matching operation," to determine if the data value in that normalized record matches a previous data value from a previously processed normalized record. The module 202 performs the census matching operation at least once for each normalized record within the stream 208. The module 202 stores information associated with a result of the census matching operation in at least one data structure stored in working memory space in the memory device 108. The working memory space used for the data structure includes both memory for any overhead of the data structure and all information in the data structure, including any memory for data referenced by pointers. If the census matching operation found a match to a previous data value, then a stored count associated with that data value is incremented. Otherwise, if the census matching operation did not find a match to a previous data value, then a new entry is stored in the data structure.

For example, the data structure may be an associative array that is able to store key-value pairs with unique keys being used to look up associated values within the array. In this example, the key is a data value from the normalized records, and the value is a count that will be incremented up to the total count for the census data. The count starts at 1 when the key-value pair is created for a normalized record with a particular data value as its key that does not match any key already existing in the associative array, and is incremented by 1 every time another normalized record has a data value that matches an existing key. The module 202 looks up data values of normalized records for different fields (as determined by the field index within each normalized record) within different associative arrays, with one associative array allocated for each of the fields being profiled. In some implementations, the number of fields being profiled is known in advance, and an empty associative array (which uses only a minimal amount of storage space) is allocated for each field at the beginning of the profiling procedure.

The associative array can be implemented, for example, using a hash table or other data structure that provides efficient lookup of the keys and modification of the associated values. The data value used as the key of a key-value pair can store a copy of the data value itself or a pointer to the data value stored in a different location in the working memory (e.g., stored in a copy of the normalized record). The associative array along with the stored copy of the data value from the normalized record, or even the entire normalized record itself, may then be collectively considered as the data structure storing the census matching results. In implementations in which pointers to data values in normalized records are stored in the associative array, only the first normalized record containing a particular key needs to be stored in the working memory, and subsequent normalized records containing that particular key can be removed from working memory after the census matching operation.

In the examples below, these associative arrays for the fields being profiled are called "census arrays" and the key-value pairs are called "census entries" within a census array. At the end of the data profiling procedure, the census arrays generated by the census generation module 202 will store all the distinct data values appearing within the table 206 within separate census entries, and the total count of the number of times that data value appears within rows of the table 206, which represent the data records being profiled.

The program performing the data profiling procedure, or a portion of the program (e.g., the census generation module 202), may be given a memory limit setting a maximum amount of working memory space within the memory device 108 that the program is allowed to use. The program may use the working memory space for storing the census arrays, which may require most of the working memory space allowed, and for storing other temporary values, which may require significantly less space than the census arrays. An overflow condition on the working memory space is satisfied when the module 202 determines that there is likely to be insufficient available working memory space to add an additional entry to the census array, or that there is no longer any available working memory space to add an additional entry (e.g., due to the last entry added). The module 202 can make this determination by measuring the memory size of the census arrays. This memory size represents the amount of the working memory space used for the census arrays, which includes the total amount of memory occupied by any overhead of the data structures representing the census arrays and all information in those data structures (including any data values or normalized records referenced by pointers within the census array). The module 202 then compares this memory size to the memory limit (or other threshold).

In some implementations, the program sets an overflow threshold to detect when the memory size of the census arrays is close to the memory limit. The memory size of the census arrays can be measured directly, for example, by computing the sum of the sizes of the individual census arrays, where the size of an individual census array is measured as a number of bits of within the working memory space occupied by that census array. Alternatively the memory size of the census arrays can be measured indirectly, for example, by computing an amount of available space left within the working memory space without directly measuring the memory size of the census arrays (e.g., a range of memory addresses that are left from an allocated block of memory addresses). In some implementations, the program sets the overflow threshold that is just below the memory limit to reserve some space for other values. In some implementations, the overflow threshold may be equal to the memory limit, for example, if the space needed for the other values is negligible and/or the computing system 104 does not impose strict memory limits, allowing the memory limit to be exceeded by small amounts for relatively short periods of time.

After an overflow condition has been triggered, the program uses an overflow processing procedure to store some data needed to generate the completed census arrays overflow storage space within the storage device 110. Exactly what is stored in the overflow storage space depends on the type of overflow processing procedure that is used. In the examples of overflow processing procedures described below, the program continues to perform the census matching operation for each normalized record processed after the overflow condition has been triggered, and stores information associated with a result of the census matching operation (i.e., an incremented count in a census entry, or a new census entry), either in the same set of census arrays in working memory or in a new set of census arrays in working memory, as described in more detail below. If an overflow condition was triggered at some point during the processing of he normalized records in the stream 208, some data will be stored in the working memory space, and some data will be stored in the overflow storage space. In the examples of overflow processing procedures described below, the data in both locations is combined in some way to generate completed census arrays. Each census array is output within its own census file 210 for processing by the census processing module 204. Again, the exact combination procedure used depends on the type of overflow processing procedure that is used. The census file 210 can optionally be output from the census generation module 202 in stages with census arrays or sets of census array entries being sent to an output port as they are completed.

The two examples of overflow processing procedures described below can both be used by the same census generation module 202. In one mode, one of the procedures can be used, and in another mode, the other of the procedures can be used. The mode can be determined by a user, for example, or by some initial analysis (e.g., performed on a subset of a dataset being profiled, or on historical profile information for the same or similar dataset) to estimate which procedures would be the most efficient. These overflow processing procedures can also be applied to other data operations in addition to the census matching operation. A data operation that allows merging of incomplete results would be compatible with the combination of results stored in the working memory space and results stored in the overflow storage space, as performed in the overflow processing procedures described below. A data operation for which at least some cases can be handled in-place would be compatible with the updating of the data structure in-place within a data structure in memory, as performed in the overflow processing procedures described below. The efficiency of the overflow processing procedures, by avoiding the time it would have taken to store certain data in the overflow storage space, is especially useful for a data operation such as a census operation or other data profiling operation used to process a potentially large volume of incoming data before allowing a user to view results of that processing or perform additional interactions that depend on that processing.

Figure 3:
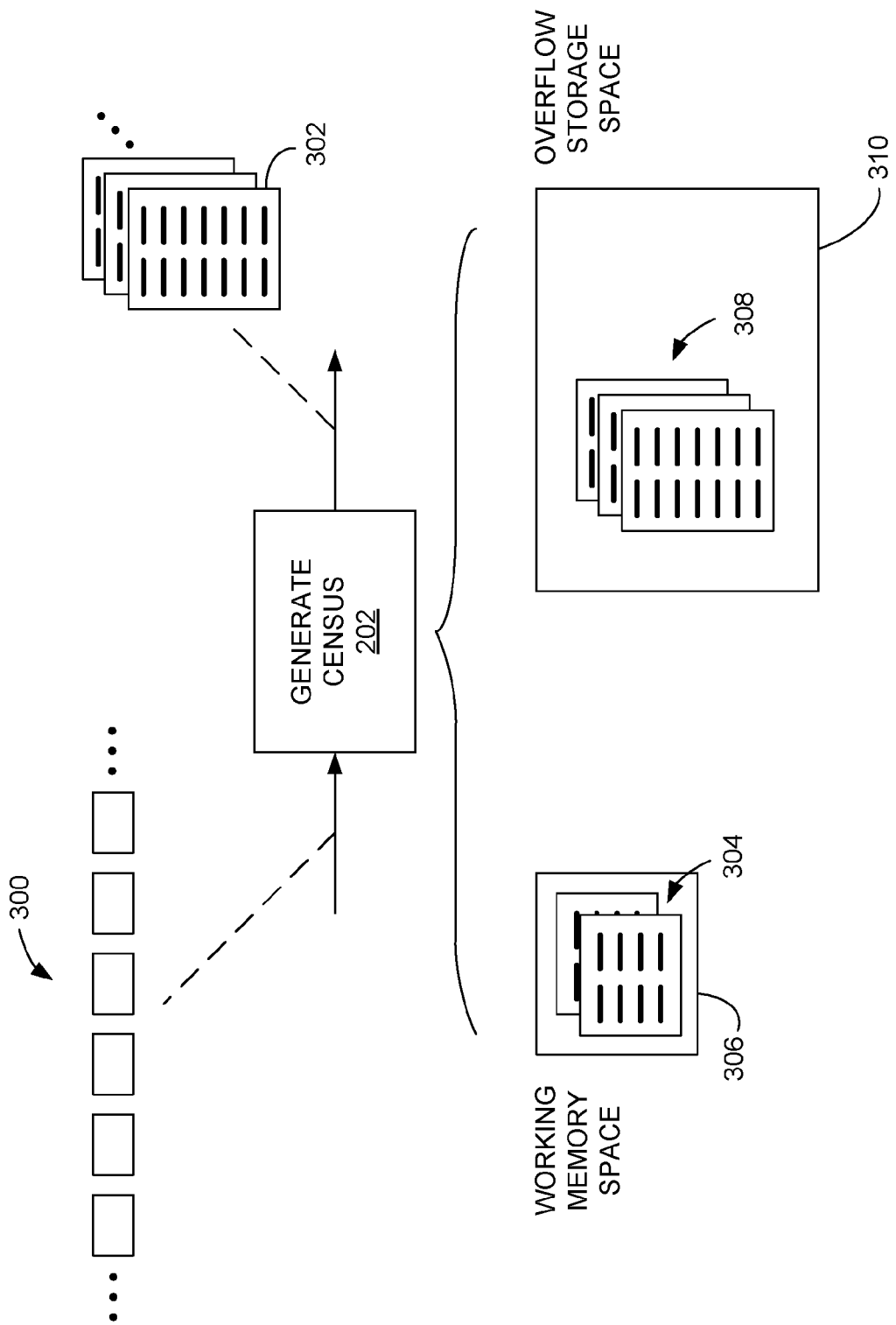
FIGS. 3 and 5 are schematic diagrams of census generation procedures.
Figure 4A:
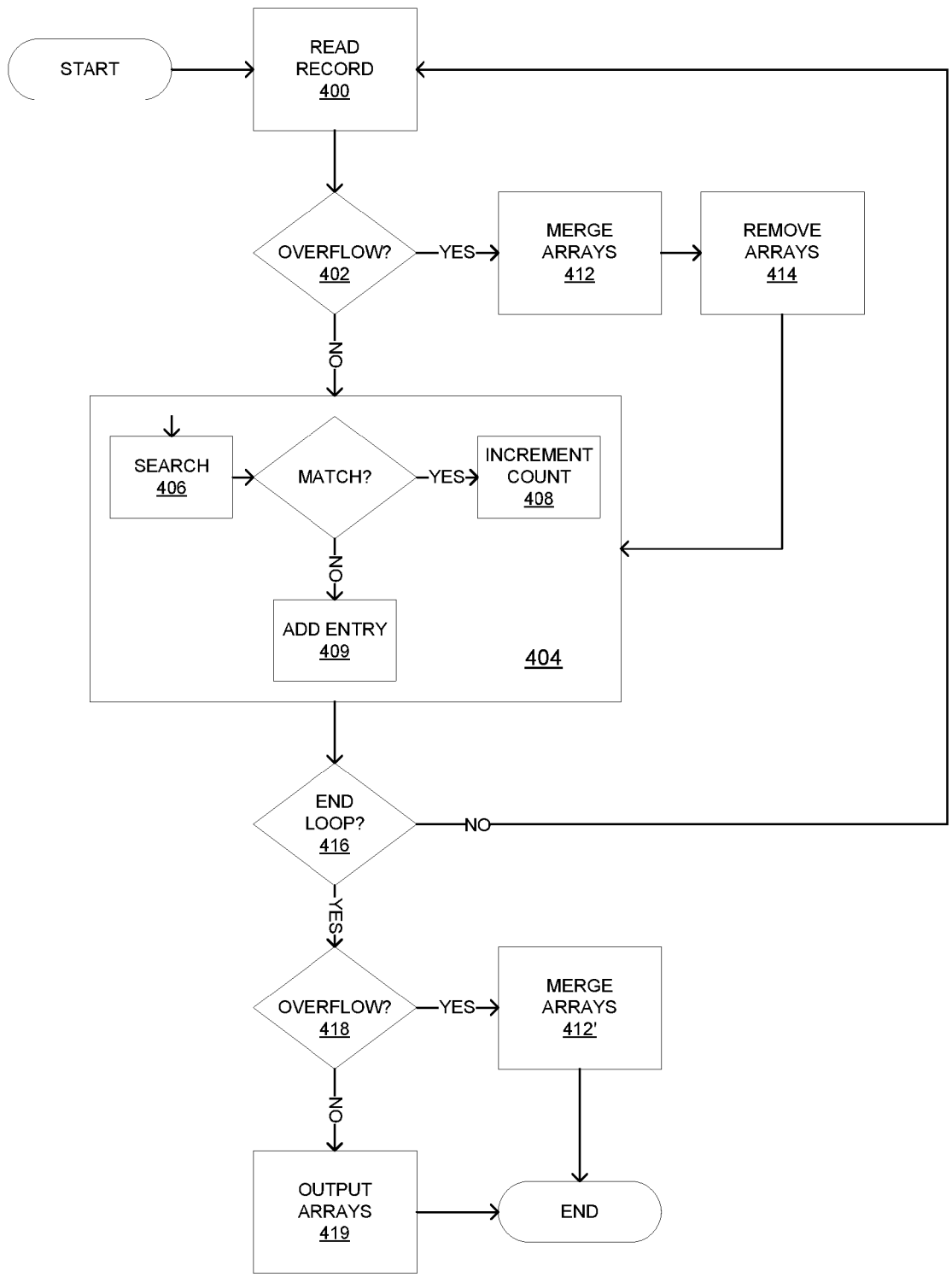
FIGS. 4A-4C and 6 are flowcharts of census generation procedures.
Figure 4B:
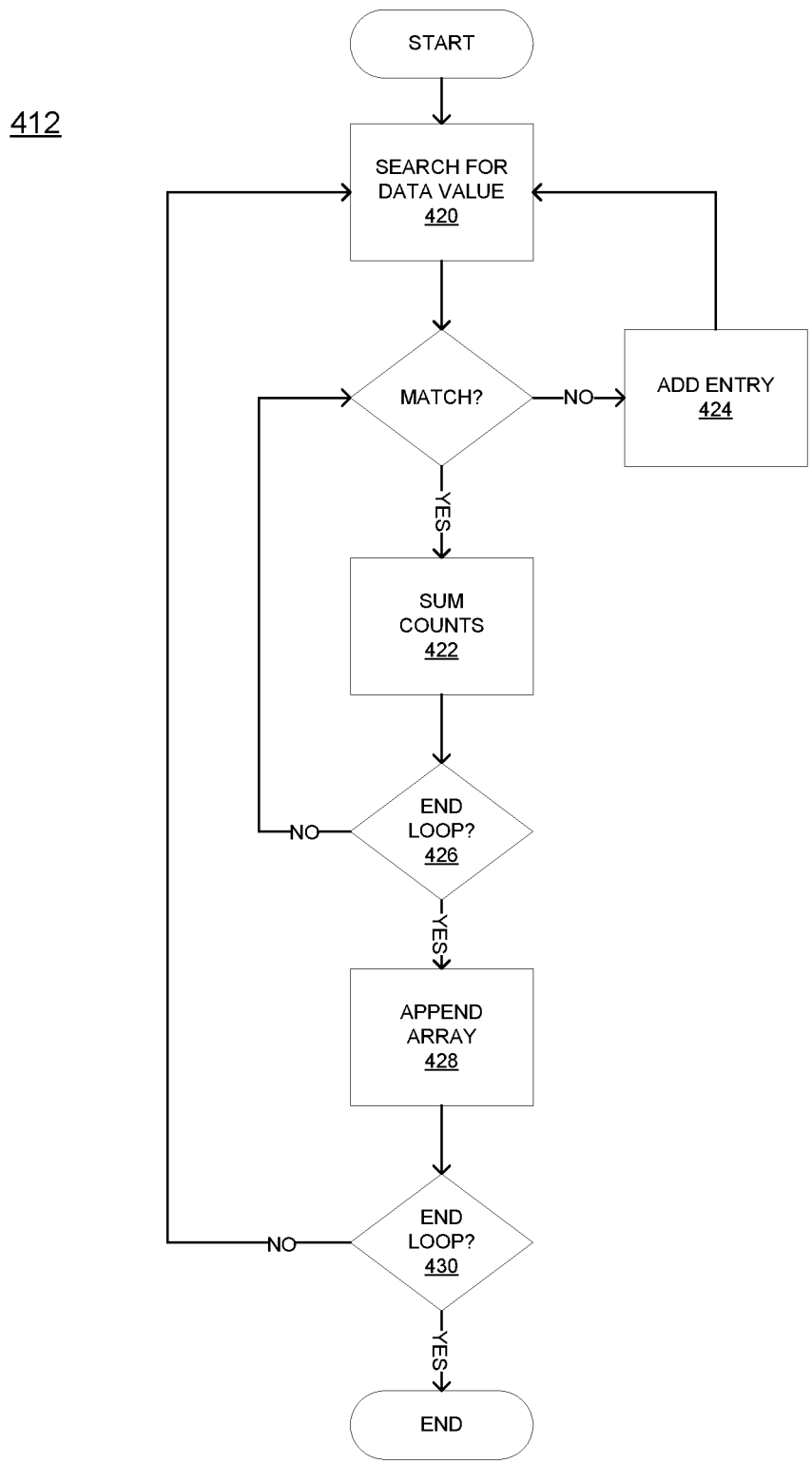
Figure 4C:
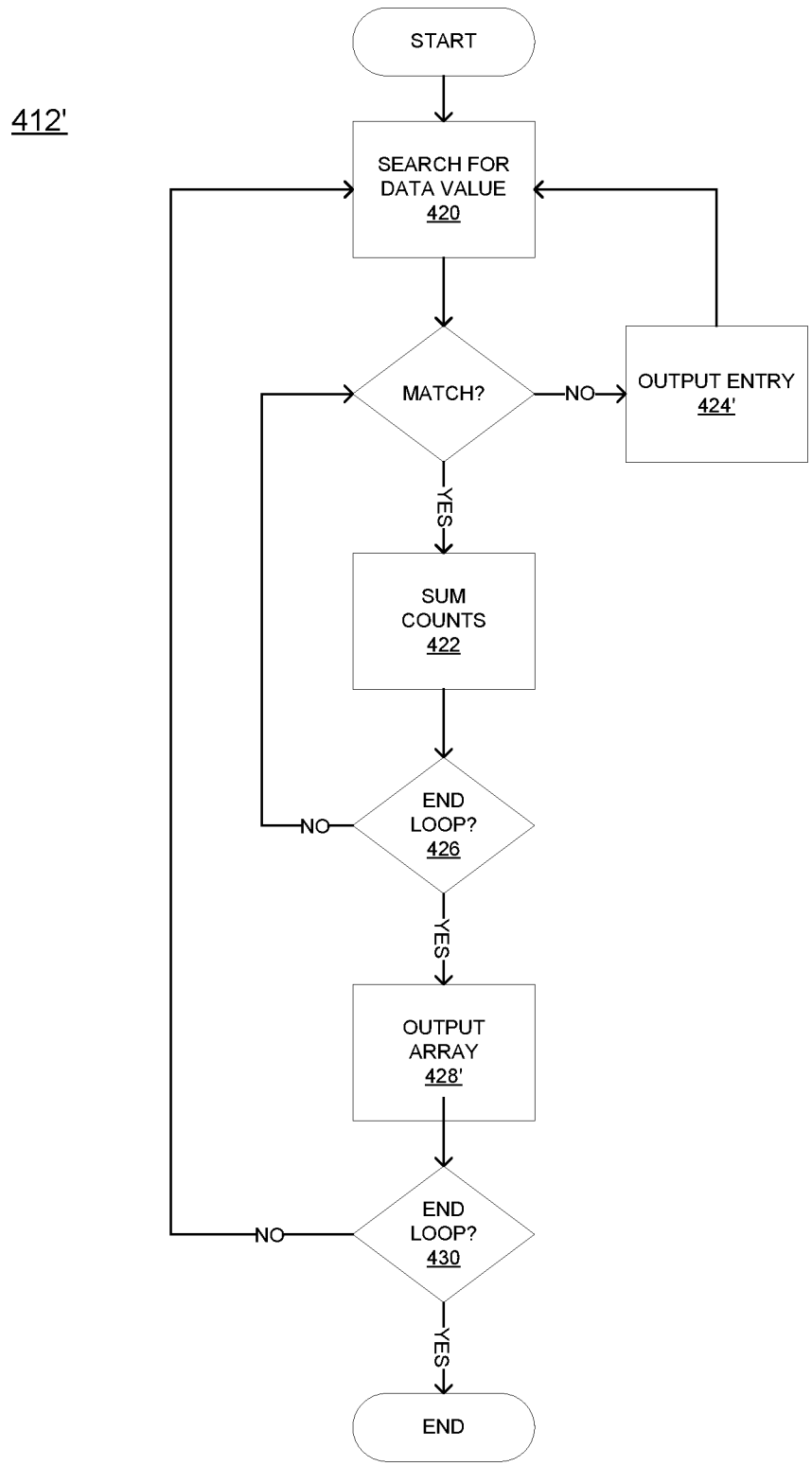

FIG. 3 illustrates census generation with a first overflow processing procedure used within the context of the census generation module 202 generating the census arrays. FIGS. 4A-4C show flowcharts corresponding to census generation with the first overflow processing procedure. Referring to FIGS. 3 and 4A, the census generation module 202 receives a stream 300 of normalized records, and by the end of the overflow processing procedure generates, for each field being profiled, a completed census array 302. The module 202 reads (400) the next normalized record as it iterates in a loop over each of the normalized records in the stream 300 (starting with the first normalized record on the first iteration). The module 202 checks (402) the memory size of the census arrays 304 being generated in the working memory space 306 to determine whether the overflow threshold has been reached.

If the overflow threshold has not been reached, then the module 202 performs a census matching operation 404 on that normalized record. The census matching operation 404 includes searching (406) the keys of the appropriate one of the census arrays 304 (the census array for the field index in the normalized record) for a match to the data value in the normalized record. If there was a match to a key (which is a data value from a previous normalized record), then the count corresponding to that key is incremented (408). If there was not a match to a key, then a new entry is added (409) to the appropriate one of the census arrays 304 with a key set to the data value and a count set to 1.

If the overflow threshold has been reached, the module 202 performs a merge operation 412 on the census arrays 304 and any previous partial census arrays 308 stored in the overflow storage space 310 (during a previous iteration). The result of the merge operation 412 (described in more detail below) is a new set of partial census arrays 308, each containing entries corresponding to the union of the keys (i.e., data values) in the merged census arrays for a given field along with the sum of the counts for each key. Thus, the information in the partial census arrays 304 that were in the working memory space 306 has been safely stored in the overflow storage space 310, and the partial census arrays 304 can now be removed (414) from the working memory space 306, freeing more working memory space 306 to perform the census matching operation 404 on the next normalized record.

At the end of an iteration, the module 202 determines (416) if the end of the stream 300 has been reached (which ends the loop iterating for each record in the stream). If the end has not been reached, another iteration starts by reading (400) the next normalized record. If the end has been reached, the module 202 determines (418) if overflow occurred during any of the iterations. If no overflow occurred, the module 202 sends (419) each of the now completed census arrays 304 in the working memory space 306 to an output port. If overflow did occur, then the module 202 performs a modified version of the merge operation 412' on the partial census arrays 304 stored in the working memory space 306 and the partial census arrays 308 stored in the overflow storage space 310 to send resulting merged census arrays to the output port. The merge operation 412 is described in more detail with reference to FIG. 4B, and the merge operation 412' is described in more detail with reference to FIG. 4C.

Referring to FIG. 4B, an example of the merge operation 412 for merging a set of partial census arrays in the working memory space 306 (called the "memory arrays") with a set of partial census arrays in the overflow storage space 310 (called the "stored arrays"). The merge operation 412 includes an outer loop that iterates over the fields (i.e., with a loop counter referencing a "current field" going from 1 to the number of fields), and an inner loop that iterates over the entries in the stored array for the field of the current field iteration (i.e., with a loop counter referencing a "current entry" going from 1 to the number of entries). The inner loop starts by searching (420) for the data value of the current entry in the stored array within the memory array for the field of the current field iteration. If a match is found, the inner loop sums (422) the count from the current entry in the stored array and the count from the matched entry in the memory array, and stores the resulting total count in the matched entry in the memory array (overwriting the previous count). Since this new total count will not need any additional space in working memory, this operation will not cause the amount of working memory space used to grow. In different implementations, either of the memory array or the stored array can be searched and used to accumulate the total counts, but by iterating over the stored array and searching the memory array, the search can be performed more efficiently (since the memory device 108 can be accessed more efficiently than the storage device 110). If a match was not found, the inner loop adds (424) the current entry in the stored array to a new census array in the overflow storage space 310, which is part of a set of new census arrays that will replace the previous stored arrays after the merge operation 412, and begins a new inner loop iteration by searching (420) for the data value of the next entry in the stored array within the memory array. The inner loop ends (426) after the last entry in the stored array has been reached. The outer loop includes appending (428) the updated memory array to the new census array so that the full set of new census arrays will represents both matched and unmatched entries from the merge operation 412. The outer loop ends (430) after the last field has been reached.

FIG. 4C shows an example of the modified version of the merge operation 412' performed to merge the last set of memory arrays with the stored arrays. In this example, the only differences are the following. Instead of adding (424) the current entry in the stored array to a new census array in the overflow storage space 310, the operation 412' outputs (424') the current entry in the stored array to an output port of the module 202 (e.g., by writing into an output census file, which may also be stored in the overflow storage space 310). Instead of appending (428) the updated memory array to the stored array, the operation 412' sends (428') the updated memory array to the output port of the module 202 (e.g., by writing into an output census file, which may also be stored in the overflow storage space 310).

To summarize, the first overflow processing procedure handles the overflow condition on working memory by moving the partial census arrays to overflow storage and continuing to process all new records (in new partial census arrays in working memory to be merged with the partial census arrays moved to overflow storage). The first overflow processing procedure efficiently manages the spilling of partial census arrays to overflow storage. A second overflow processing procedure will similarly handle the overflow condition while continuing to process all new records, but will be configured to efficiently manage the spilling of non-matching records to overflow storage instead of the partial census arrays.

Figure 5:
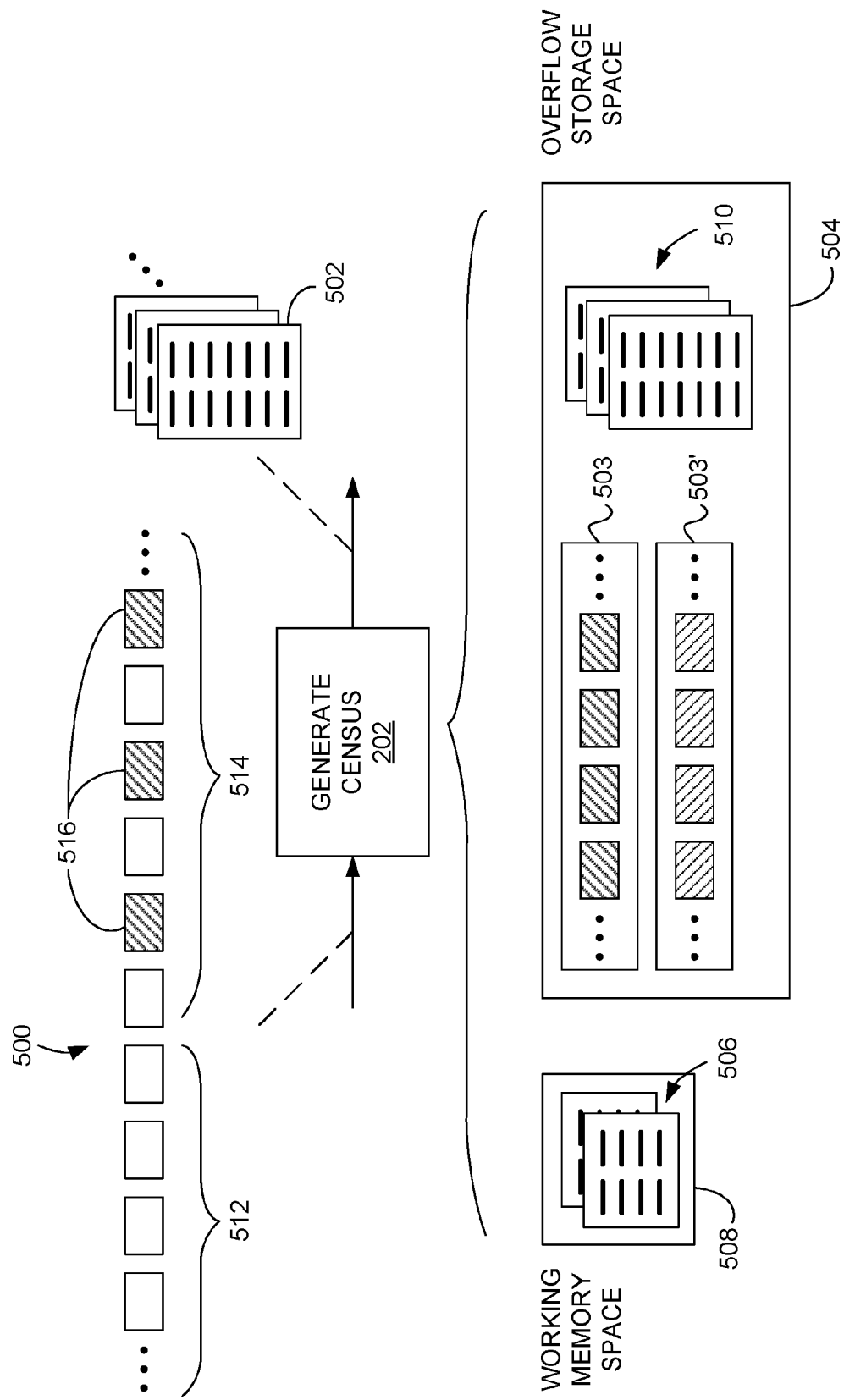
Figure 6:
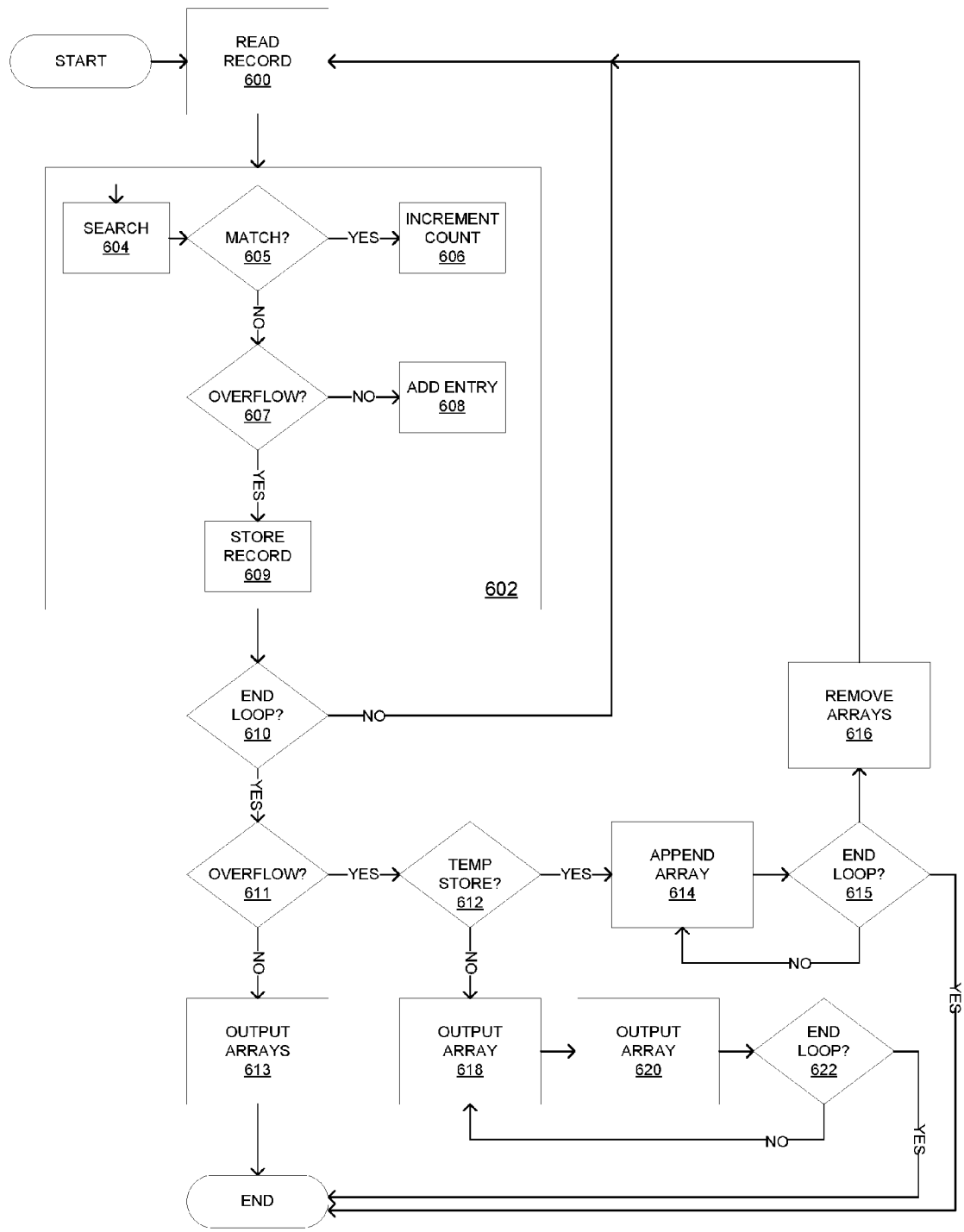

FIG. 5 illustrates census generation with a second overflow processing procedure used within the context of the census generation module 202 generating the census arrays. FIG. 6 shows a flowchart corresponding to census generation with the second overflow processing procedure. Referring to FIGS. 5 and 6, the census generation module 202 receives a stream 500 of normalized records, and by the end of the overflow processing procedure generates, for each field being profiled, a completed census array 502. The module 202 reads (600) the next normalized record as it iterates in a loop over each of the normalized records in the stream 500 in a first pass, or iterates in a loop over each of a set of normalized records that have been temporarily stored in a temporary record store 503 in the overflow storage space 504, in one or more additional passes. The steps performed in the one or more passes are described in more detail below, but essentially, each pass involves filling up the working memory space 306 until the threshold condition is met and then processing all matching records in-place and spilling all non-matching records after the threshold condition is met. The module 202 performs a census matching operation 602 on that normalized record.

The census matching operation 602 includes searching (604) the keys of the appropriate one of the census arrays 506 being generated in the working memory space 508 (the census array for the field index in the normalized record) for a match (605) to the data value in the normalized record. If there was a match to a key (which is a data value from a previous normalized record), then the count corresponding to that key is incremented (606). This incrementing (606) can occur without using more of the working memory space 508 (e.g., using an in-place operation to increment the count of the matched entry), and therefore does not depend on whether or not the overflow threshold has been reached. If there was not a match to a key, then the next action depends on results of a check (607) on the memory size of the census arrays 506 to determine whether the overflow threshold has been reached. If the overflow threshold has not been reached, then a new entry is added (608) to the appropriate one of the census arrays 506 with a key set to the data value and a count set to 1. If the overflow threshold has been reached, then the module 202 stores (609) the normalized record in a new temporary record store 503 in the overflow storage space 504. The temporary record store 503 can be a single file (or other data structure) storing the normalized records, or can be multiple files (or other data structures) providing access to normalized records by field index (or other characteristic). There is a different temporary record store 503 with different sets of normalized records for different passes.

The module 202 determines (610) if the end of the first pass through the stream 500 has been reached (which ends the loop iterating for each record in the stream), or if the end of a pass through one of the temporary record stores 503 has been reached. If the end of a pass has not been reached, another iteration starts by reading (600) the next normalized record. If the end of a pass has been reached, the module 202 determines (611) if overflow occurred during any of the previous iterations for the current pass. If no overflow occurred, the module 202 sends (613) each of the now completed census arrays 506 in the working memory space 508 to an output port. If overflow did occur, then the module 202 checks (612) to determine if there remains any temporary record store 503.

If there is at least one temporary record store 503 remaining, then the module 202 starts to free space in the working memory to process the normalized records in that store 503 by iterating over the fields (i.e., with a loop counter referencing a "current field" going from 1 to the number of fields) and appending (614) the appropriate one of the partial census arrays 506 to a corresponding one (with the same field index) of any partial census arrays 510 stored in the overflow storage space 504 (during a previous iteration). The loop ends (615) after the last field has been reached. Thus, the information in the partial census arrays 506 in the working memory space 508 has been safely stored in the overflow storage space 504, and the partial census arrays 506 can be removed (616) from the working memory space 508, freeing more working memory space 508 to read (600) the next normalized record from the remaining temporary record store 503, and perform the census matching operation 602 on that normalized record.

The partial census arrays 506 and the partial census arrays 510 can simply be appended without requiring a merge operation to be performed since any normalized record with a data value that would have matched a key in the census arrays 510 would have been processed when those census arrays 510 were being generated in the working memory space 508, and therefore none of those data values can exist in any of the census arrays 506 currently in the working memory space 508. The entries in the partial census arrays 506 and the partial census arrays 510 can optionally be sorted or rearranged into one or more other data structures if it is helpful (e.g., for efficiency of accessing those entries), but no individual entries need to combined to consolidate information for a particular data value.

In an example of how the module 202 passes processes records from the stream 500, after a first subset 512 of normalized records from the stream 500 has been processed to expand the memory size of the census arrays 506 to the overflow threshold, a second subset 514 of normalized records is processed to continue incrementing counts of the census arrays 506, for data values that match a key (from records shown as unshaded boxes), or to store a third subset 516 of normalized records (shown as shaded boxes) into a temporary record store 503. Note that the third subset 516 is also a subset of the second subset 514. This process continues with the stream 500 being replaced by the temporary record store 503, with potentially a new (smaller) temporary record store 503' being generated while iterating through the current temporary record store 503.

If there is no temporary record store 503 remaining after checking (612), then the module 202 iterates over the fields (i.e., from 1 to the number of fields), sending (618) the appropriate one of the census arrays 506 from the working memory space 508 to the output port, and sending (620) the appropriate one of the census arrays 510 from the overflow storage space 504 to the output port. The loop ends (622) after the last field has been reached. Sending the census arrays 506 and 510 to the output port in this part of the census generation enables the census arrays to be output in field index order (as opposed to partial census arrays for different fields being output as soon as they are ready). This may be useful, for example, if there is a downstream computation after the census processing module 204 that needs the census arrays to be provided in that order. Alternatively, other implementations of the census generation that do not necessarily require an ordered output can avoid storing the partial census arrays 506 from the working memory space 508 in the overflow storage space 504, and instead can simply output the partial census arrays 506 to the output port directly from the working memory space 508 (for the same reason that a merge operation did not need to be performed when appending them).

To summarize, the second overflow processing procedure handles the overflow condition on working memory by moving non-matching records to overflow storage and continuing to process all new records (updating the census arrays already in working memory for any matching records). The second overflow processing procedure efficiently manages the spilling of non-matching records to overflow storage.

There are some differences between the first and second overflow processing procedures, which may make one or the other more appropriate (i.e., more efficient) in certain cases. The first overflow processing procedure does not need to spill records to overflow storage, while the second overflow processing procedure does. But, the second overflow processing procedure does not need to merge census arrays, while the first overflow processing procedure does. Also, since the second overflow processing procedure keeps the same census arrays in working memory after the overflow condition until reading through a full pass of the records in an input stream, the initial distribution of values determine which later values will be matched or non-matched. So, the second overflow processing procedure may tend to enable efficient spilling for situations in which the distribution of repeated values (if any) in a given field are relatively even over all of the records in an input stream. The first overflow processing procedure enables a completely new set of values to be matched each time the census arrays are spilled to overflow storage. So, the first overflow processing procedure may tend to enable efficient spilling for situations in which there is a significant change in the distribution of repeated values in one or more fields over all of the records in the input stream.

Other overflow processing procedures are also possible. For example, a hybrid between the first and second procedures described above may start handling the overflow condition by storing normalized records that do not match a census array in the overflow storage space (i.e., according to the second procedure). Then, if the fraction of stored normalized records that do not match becomes larger than a particular threshold, the procedure may move the partial census arrays in the working memory space to the overflow storage space (merging with any previously stored partial census arrays), and continue processing the normalized records in the current pass (i.e., according to the first procedure). After that pass of the first procedure is done, the procedure would continue by processing the normalized records stored in the overflow storage space, using the same hybrid process (i.e., when the overflow condition is reached start storing non-matching normalized records until a threshold is reached).

The techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository. The modules of the program can store the array data in any of a variety of data structures, such as hash tables or flat files, which may optionally be indexed and/or compressed, for example.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computing system, including:
a memory device providing a working memory space;
a storage device providing an overflow storage space; and
at least one processor configured to process a plurality of data units to generate result information, the processing including:
performing a data operation for each data unit of a first subset of data units from the plurality of data units, the data operation including searching for a value in the data unit within at least one data structure of a first set of one or more data structures stored in the working memory space, and if the value is found modifying information in at least one data structure of the first set, and if the value is not found adding information to at least one data structure of the first set;
after an overflow condition on the working memory space is satisfied, storing information in the overflow storage space and freeing at least some of the working memory space, and for each data unit of a second subset of data units from the plurality of data units, performing the data operation including searching for a value in the data unit within at least one data structure of a second set of one or more data structures stored in the working memory space, and if the value is found modifying information in at least one data structure of the second set; and
combining multiple sets of one or more data structures, including the first and second sets, to generate the result information.

2. The computing system of claim 1, wherein the overflow condition on the working memory space is satisfied if the amount of the working memory space used for the first set of one or more data structures is greater than or equal to a predetermined threshold.

3. The computing system of claim 1, wherein the processing further includes, after the overflow condition being satisfied and before performing the searching for each data unit of the second subset of data units, storing the first set of one or more data structures in the overflow storage space, and removing the first set of one or more data structures from the working memory space.

4. The computing system of claim 1, wherein modifying the information includes performing an in-place memory operation that overwrites a value stored in a location within the working memory space with a different value stored in the same location within the working memory space.

5. The computing system of claim 1, wherein the processing further includes generating the plurality of data units from a data source, with each data unit including an identifier for a field of the data source and a value appearing in that field within a record of the data source.

6. The computing system of claim 1, wherein the memory device includes a volatile memory device.

7. The computing system of claim 1, wherein the storage device includes a non-volatile storage device.

8. The computing system of claim 1, wherein combining multiple sets of one or more data structures includes merging at least one data structure from the first set with at least one data structure from the second set.

9. The computing system of claim 8, wherein merging at least one data structure from the first set with at least one data structure from the second set includes matching a first key in the data structure from the first set of one or more data structures with a second key in the data structure from the second set of one or more data structures, and performing an aggregation operation on a value associated with the first key and a value associated with the second key.

10. The computing system of claim 1, wherein the processing further includes, after the overflow condition being satisfied and before performing the searching for each data unit of the second subset of data units, for each data unit of a third subset of data units from the plurality of data units, searching for a value in the data unit within at least one data structure of the first set of one or more data structures stored in the working memory space, and if the value is found modifying information in at least one data structure of the first set.

11. The computing system of claim 10, wherein the second subset of data units is a subset of the data units of the third subset of data units.

12. The computing system of claim 5, wherein the first set of one or more data structures includes a plurality of associative arrays of key-value pair entries.

13. The computing system of claim 12, wherein searching for the value in the data unit within at least one data structure of a first set of one or more data structures stored in the working memory space includes searching for the value as a key for an entry within a selected one of the associative arrays of key-value pair entries.

14. The computing system of claim 13, wherein the selected one of the associative arrays of key-value pair entries corresponds to the identifier in the data unit.

15. The computing system of claim 13, wherein modifying information in at least one data structure of the first set includes incrementing the value of the key-value pair entry that was found.

16. The computing system of claim 13, wherein adding information to at least one data structure of the first set includes adding a new key-value pair entry to the selected array having as its key the value in the data unit and having as its value a count of one.

17. A computing system, including:
  means for providing a working memory space;
  means for providing an overflow storage space; and
  means for processing a plurality of data units to generate result information, the processing including:
    performing a data operation for each data unit of a first subset of data units from the plurality of data units, the data operation including searching for a value in the data unit within at least one data structure of a first set of one or more data structures stored in the working memory space, and if the value is found modifying information in at least one data structure of the first set, and if the value is not found adding information to at least one data structure of the first set;
    after an overflow condition on the working memory space is satisfied, storing information in the overflow storage space and freeing at least some of the working memory space, and for each data unit of a second subset of data units from the plurality of data units, performing the data operation including searching for a value in the data unit within at least one data structure of a second set of one or more data structures stored in the working memory space, and if the value is found modifying information in at least one data structure of the second set; and
    combining multiple sets of one or more data structures, including the first and second sets, to generate the result information.

18. A method for processing a plurality of data units to generate result information, including:
  performing a data operation for each data unit of a first subset of data units from the plurality of data units, the data operation including searching for a value in the data unit within at least one data structure of a first set of one or more data structures stored in working memory space of a memory device, and if the value is found modifying information in at least one data structure of the first set, and if the value is not found adding information to at least one data structure of the first set;
  after an overflow condition on the working memory space is satisfied, storing information in overflow storage space of a storage device and freeing at least some of the working memory space, and for each data unit of a second subset of data units from the plurality of data units, performing the data operation including searching for a value in the data unit within at least one data structure of a second set of one or more data structures stored in the working memory space, and if the value is found modifying information in at least one data structure of the second set; and
  combining multiple sets of one or more data structures, including the first and second sets, to generate the result information.

19. The method of claim 18, wherein the overflow condition on the working memory space is satisfied if the amount of the working memory space used for the first set of one or more data structures is greater than or equal to a predetermined threshold.

20. The method of claim 18, wherein the processing further includes, after the overflow condition being satisfied and before performing the searching for each data unit of the second subset of data units, storing the first set of one or more data structures in the overflow storage space, and removing the first set of one or more data structures from the working memory space.

21. The method of claim 18, wherein modifying the information includes performing an in-place memory operation that overwrites a value stored in a location within the working memory space with a different value stored in the same location within the working memory space.

22. The method of claim 18, wherein the memory device includes a volatile memory device.

23. The method of claim 18, wherein the storage device includes a non-volatile storage device.

24. The method of claim 18, wherein combining multiple sets of one or more data structures includes merging at least one data structure from the first set with at least one data structure from the second set.

25. The method of claim 24, wherein merging at least one data structure from the first set with at least one data structure from the second set includes matching a first key in the data structure from the first set of one or more data structures with a second key in the data structure from the second set of one or more data structures, and performing an aggregation operation on a value associated with the first key and a value associated with the second key.

26. The method of claim 18, wherein the processing further includes, after the overflow condition being satisfied and before performing the searching for each data unit of the second subset of data units, for each data unit of a third subset of data units from the plurality of data units, searching for a value in the data unit within at least one data structure of the first set of one or more data structures stored in the working memory space, and if the value is found modifying information in at least one data structure of the first set.

27. The method of claim 26, wherein the second subset of data units is a subset of the data units of the third subset of data units.

28. The method of claim 18, wherein the processing further includes generating the plurality of data units from a data source, with each data unit including an identifier for a field of the data source and a value appearing in that field within a record of the data source.

29. The method of claim 28, wherein the first set of one or more data structures includes a plurality of associative arrays of key-value pair entries.

30. The method of claim 29, wherein searching for the value in the data unit within at least one data structure of a first set of one or more data structures stored in the working memory space includes searching for the value as a key for an entry within a selected one of the associative arrays of key-value pair entries.

31. The method of claim 30, wherein the selected one of the associative arrays of key-value pair entries corresponds to the identifier in the data unit.

32. The method of claim 30, wherein modifying information in at least one data structure of the first set includes incrementing the value of the key-value pair entry that was found.

33. The method of claim 30, wherein adding information to at least one data structure of the first set includes adding a new key-value pair entry to the selected array having as its key the value in the data unit and having as its value a count of one.

34. Software stored on a computer-readable medium for processing a plurality of data units to generate result information, the software including instructions for causing a computing system to:

perform a data operation for each data unit of a first subset of data units from the plurality of data units, the data operation including searching for a value in the data unit within at least one data structure of a first set of one or more data structures stored in working memory space of a memory device, and if the value is found modifying information in at least one data structure of the first set, and if the value is not found adding information to at least one data structure of the first set;

after an overflow condition on the working memory space is satisfied, store information in overflow storage space of a storage device and free at least some of the working memory space, and for each data unit of a second subset of data units from the plurality of data units, perform the data operation including searching for a value in the data unit within at least one data structure of a second set of one or more data structures stored in the working memory space, and if the value is found modifying information in at least one data structure of the second set; and combine multiple sets of one or more data structures, including the first and second sets, to generate the result information.

35. The software of claim 34, wherein the overflow condition on the working memory space is satisfied if the amount of the working memory space used for the first set of one or more data structures is greater than or equal to a predetermined threshold.

36. The software of claim 34, wherein the processing further includes, after the overflow condition being satisfied and before performing the searching for each data unit of the second subset of data units, storing the first set of one or more data structures in the overflow storage space, and removing the first set of one or more data structures from the working memory space.

37. The software of claim 34, wherein modifying the information includes performing an in-place memory operation that overwrites a value stored in a location within the working memory space with a different value stored in the same location within the working memory space.

38. The software of claim 34, wherein the memory device includes a volatile memory device.

39. The software of claim 34, wherein the storage device includes a non-volatile storage device.

40. The software of claim 34, wherein combining multiple sets of one or more data structures includes merging at least one data structure from the first set with at least one data structure from the second set.

41. The software of claim 40, wherein merging at least one data structure from the first set with at least one data structure from the second set includes matching a first key in the data structure from the first set of one or more data structures with a second key in the data structure from the second set of one or more data structures, and performing an aggregation operation on a value associated with the first key and a value associated with the second key.

42. The software of claim 34, wherein the processing further includes, after the overflow condition being satisfied and before performing the searching for each data unit of the second subset of data units, for each data unit of a third subset of data units from the plurality of data units, searching for a value in the data unit within at least one data structure of the first set of one or more data structures stored in the working memory space, and if the value is found modifying information in at least one data structure of the first set.

43. The software of claim 42, wherein the second subset of data units is a subset of the data units of the third subset of data units.

44. The software of claim 34, wherein the processing further includes generating the plurality of data units from a data source, with each data unit including an identifier for a field of the data source and a value appearing in that field within a record of the data source.

45. The software of claim 44, wherein the first set of one or more data structures includes a plurality of associative arrays of key-value pair entries.

46. The software of claim 45, wherein searching for the value in the data unit within at least one data structure of a first set of one or more data structures stored in the working memory space includes searching for the value as a key for an entry within a selected one of the associative arrays of key-value pair entries.

47. The software of claim 46, wherein the selected one of the associative arrays of key-value pair entries corresponds to the identifier in the data unit.

48. The software of claim 46, wherein modifying information in at least one data structure of the first set includes incrementing the value of the key-value pair entry that was found.

49. The software of claim 46, wherein adding information to at least one data structure of the first set includes adding a new key-value pair entry to the selected array having as its key the value in the data unit and having as its value a count of one.

* * * * *